United States Patent
Gilbert-Eyres et al.

(10) Patent No.: US 11,872,937 B2
(45) Date of Patent: Jan. 16, 2024

(54) SEVERITY PREDICTION SYSTEM AND METHOD

(71) Applicant: GM GLOBAL TECHNOLOGY OPERATIONS LLC, Detroit, MI (US)

(72) Inventors: Matthew E. Gilbert-Eyres, Rochester, MI (US); Russell A. Patenaude, Macomb Township, MI (US); Eric T. Hosey, Royal Oak, MI (US); Matthew Neely, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 80 days.

(21) Appl. No.: 17/672,802

(22) Filed: Feb. 16, 2022

(65) Prior Publication Data

US 2023/0256903 A1 Aug. 17, 2023

(51) Int. Cl.
*B60Q 9/00* (2006.01)

(52) U.S. Cl.
CPC .................................... *B60Q 9/008* (2013.01)

(58) Field of Classification Search
CPC ...................................................... B60Q 9/008
USPC ............................................................ 340/438
See application file for complete search history.

(56) References Cited

U.S. PATENT DOCUMENTS

| | | | | |
|---|---|---|---|---|
| 6,293,584 B1* | 9/2001 | Levine | ................... | B60N 2/888 296/68.1 |
| 6,634,669 B2* | 10/2003 | Levine | ............... | B60R 21/01512 296/68.1 |
| 6,916,040 B1* | 7/2005 | Levine | ................. | B60N 2/4221 296/68.1 |
| 9,672,719 B1* | 6/2017 | Hollenstain | ............ | G08B 21/18 |
| 2002/0158453 A1* | 10/2002 | Levine | ............... | B60N 2/42736 280/735 |
| 2006/0220904 A1* | 10/2006 | Jarlengrip | ............ | B62D 15/029 340/901 |
| 2006/0267747 A1* | 11/2006 | Kondo | ................... | B60Q 9/008 340/435 |
| 2007/0100525 A1* | 5/2007 | Mattes | ................... | B60R 21/01 701/45 |
| 2013/0099908 A1* | 4/2013 | Salomonsson | ...... | B60R 21/0134 340/425.5 |
| 2013/0223686 A1* | 8/2013 | Shimizu | ................. | G08G 1/166 382/103 |
| 2015/0266420 A1* | 9/2015 | Bryant | ................... | H04N 7/188 348/148 |
| 2016/0144785 A1* | 5/2016 | Shimizu | ................. | B60R 11/02 340/435 |

(Continued)

*Primary Examiner* — Kerri L McNally
*Assistant Examiner* — Thang D Tran
(74) *Attorney, Agent, or Firm* — Quinn IP Law

(57) ABSTRACT

A system for detecting one or more characteristics of an object within an automotive vehicle includes one or more sensors mounted within an interior of the vehicle or on an exterior of the vehicle, with each sensor being configured to detect a location, an orientation, a size and/or an object type of the object, and a controller operably connected with the one or more sensors and configured to assess whether the object is disposed in a predetermined alertworthy disposition. A method for detecting characteristics of the object within the vehicle includes determining the location, orientation, size and/or object type of the object using the one or more sensors, and assessing whether the object is disposed in a predetermined alertworthy disposition.

20 Claims, 5 Drawing Sheets

(56) References Cited

U.S. PATENT DOCUMENTS

| | | | |
|---|---|---|---|
| 2017/0060234 A1* | 3/2017 | Sung | B60K 37/00 |
| 2018/0218611 A1* | 8/2018 | Nagura | B60Q 9/00 |
| 2018/0272936 A1* | 9/2018 | Worthen | B60R 1/12 |
| 2019/0130560 A1* | 5/2019 | Horowitz | G06F 18/41 |
| 2020/0180653 A1* | 6/2020 | Chi | B60W 10/04 |
| 2020/0238904 A1* | 7/2020 | Kim | B60W 50/14 |
| 2020/0311475 A1* | 10/2020 | el Kaliouby | G06V 20/593 |
| 2020/0394428 A1* | 12/2020 | Turcot | G06V 20/59 |
| 2021/0127204 A1* | 4/2021 | Porta | G06N 20/20 |
| 2021/0294081 A1* | 9/2021 | Wang | G03B 30/00 |
| 2021/0312198 A1* | 10/2021 | Hashimoto | G06T 7/73 |
| 2021/0389426 A1* | 12/2021 | Millischer | G01S 7/486 |
| 2022/0118906 A1* | 4/2022 | Wang | B60Q 9/008 |
| 2022/0281442 A1* | 9/2022 | Pandy | B60W 10/04 |
| 2022/0291690 A1* | 9/2022 | Goyal | B60W 50/0097 |
| 2023/0003874 A1* | 1/2023 | Yu | G01S 7/027 |
| 2023/0075493 A1* | 3/2023 | Kabkab | G06V 20/582 |
| 2023/0077259 A1* | 3/2023 | Katzourakis | B60W 60/001 |

* cited by examiner

SEVERITY PREDICTION SYSTEM AND METHOD

INTRODUCTION

This disclosure relates generally to systems and methods for detecting one or more characteristics of an object within an automotive vehicle for the purpose of injury severity prediction.

In some automotive vehicles, one or more cameras or other sensors may be provided for the safety or convenience of the driver. For example, some vehicles are equipped with sensors or cameras mounted on the exterior of the vehicle that aid with parking, backing up, changing lanes and the like. Additionally, cameras or sensors may be provided within the interior cabin of the vehicle to monitor the eyes of the driver so that the driver may be alerted if it is detected that the driver's eyes have been closed for longer than normal or the driver's head is nodding, which can indicate that the driver may be falling asleep.

SUMMARY

According to one embodiment, a method for detecting one or more characteristics of an object within an automotive vehicle includes: determining one or more of a location, an orientation, a size and an object type of the object within the vehicle using one or more sensors, wherein each of the one or more sensors is mounted within an interior of the vehicle or on an exterior of the vehicle; and assessing whether the object is disposed in a predetermined alertworthy disposition.

If the object is assessed as being disposed in a predetermined alertworthy disposition, then a visual or auditory alert may be provided within the vehicle of the alertworthy disposition of the object. Additionally, a visual or auditory corrective action suggestion may be provided within the vehicle for mitigating the alertworthy disposition.

The one or more sensors may be at least one of an interior camera mounted within the interior of the vehicle, an exterior camera mounted on the exterior of the vehicle, a RADAR device mounted within the interior of the vehicle, a LiDAR device mounted within the interior of the vehicle, an ultrasonic device mounted within the interior of the vehicle, a seat occupancy sensor mounted in a seat within the interior of the vehicle, and a seat position sensor mounted in the seat within the interior of the vehicle.

The predetermined alertworthy disposition may include: (i) if the object is not a human occupant, then one or more of: (a) being disposed so as to obstruct a view of a driver of the vehicle to a front, a rear or a side of the vehicle, and (b) being disposed so as to have a substantial likelihood of causing bodily injury to an occupant within the vehicle in the event of an impact event; or (ii) if the object is a human occupant, then one or more of: (w) at least one foot of the occupant resting on a dashboard of the vehicle, (x) a body of the occupant being less than a predetermined minimum distance away from a steering wheel of the vehicle, (y) the body of the occupant facing in a non-forward direction, and (z) the occupant being disposed in an orientation and/or a location that presents a potential for causing or exacerbating injury to the occupant in the event of an impact event, wherein the potential is greater than a predetermined allowable potential.

The object type may include one or more of a non-human physical object, an infant in a forward-facing infant car seat, an infant in a rearward-facing infant car seat, a booster-seated human occupant, a helmet-wearing human occupant, and a non-booster-seated, non-helmet-wearing human occupant. Additionally, the location of the object may be a location of a centroid of the object.

The method may further include detecting whether a vehicle impact event has occurred, and if a vehicle impact event is detected, then the determined location, orientation, size and/or object type of the object may be wirelessly broadcasted. Additionally, the method may further include determining an enhanced injury severity prediction based on the wirelessly broadcasted location, orientation, size and/or object type of the object, and sending the enhanced injury severity prediction to one or more first responders. The method may also include storing object information indicative of the determined location, orientation, size and/or object type of the object, as well as wirelessly transmitting object information indicative of the determined location, orientation, size and/or object type of the object.

According to another embodiment, a method for detecting one or more characteristics of an occupant within an automotive vehicle includes: (i) determining one or more of a location, an orientation, a size and an occupant type of the occupant using one or more sensors, wherein each of the one or more sensors is an interior camera mounted within an interior of the vehicle, an exterior camera mounted on an exterior of the vehicle, a RADAR device mounted within the interior of the vehicle, a LiDAR device mounted within the interior of the vehicle or an ultrasonic device mounted within the interior of the vehicle; (ii) assessing whether the occupant is disposed in a predetermined alertworthy disposition; and (iii) if the occupant is assessed as being disposed in a predetermined alertworthy disposition, then providing a visual or auditory alert within the vehicle of the alertworthy disposition of the occupant.

In this method, the occupant type may include one or more of an infant in a forward-facing infant car seat, an infant in a rearward-facing infant car seat, a booster-seated human occupant, a helmet-wearing human occupant, and a non-booster-seated, non-helmet-wearing human occupant. Additionally, the predetermined alertworthy disposition may include one or more of the occupant having at least one foot resting on a dashboard of the vehicle, a body of the occupant being less than a predetermined minimum distance away from a steering wheel of the vehicle, the body of the occupant facing in a non-forward direction, and the occupant being disposed in an orientation and/or a location that presents a potential for causing or exacerbating injury to the occupant in the event of an impact event, wherein the potential is greater than a predetermined allowable potential.

According to yet another embodiment, a system for detecting one or more characteristics of an object within an automotive vehicle includes one or more sensors each mounted within an interior of the vehicle or on an exterior of the vehicle, and a controller operably connected with the one or more sensors. Each of the one or more sensors is configured to detect one or more of a location, an orientation, a size and an object type of the object within the vehicle, and the controller is configured to assess whether the object is disposed in a predetermined alertworthy disposition.

In this system, the one or more sensors may be at least one of an interior camera mounted within the interior of the vehicle, an exterior camera mounted on the exterior of the vehicle, a RADAR device mounted within the interior of the vehicle, a LiDAR device mounted within the interior of the vehicle, an ultrasonic device mounted within the interior of the vehicle, a seat occupancy sensor mounted in a seat within the interior of the vehicle, and a seat position sensor mounted in the seat within the interior of the vehicle.

Additionally in this system, the predetermined alertworthy disposition may include: (i) if the object is not a human occupant, then one or more of: (a) being disposed so as to obstruct a view of a driver of the vehicle to a front, a rear or a side of the vehicle, and (b) being disposed so as to have a substantial likelihood of causing bodily injury to an occupant within the vehicle in the event of an impact event; or (ii) if the object is a human occupant, then one or more of: (w) at least one foot of the occupant resting on a dashboard of the vehicle, (x) a body of the occupant being less than a predetermined minimum distance away from a steering wheel of the vehicle, (y) the body of the occupant facing in a non-forward direction, and (z) the occupant being disposed in an orientation and/or a location that presents a potential for causing or exacerbating injury to the occupant in the event of an impact event, wherein the potential is greater than a predetermined allowable potential.

The system may further include a memory operably connected with the controller and configured to store object information indicative of the determined location, orientation, size and/or object type of the object, as well as a transmitter operably connected with the controller and configured to wirelessly transmit object information indicative of the determined location, orientation, size and/or object type of the object. The system may also include an alert device operably connected with the controller and configured to provide visual or auditory alerts within the vehicle of the alertworthy disposition of the object.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
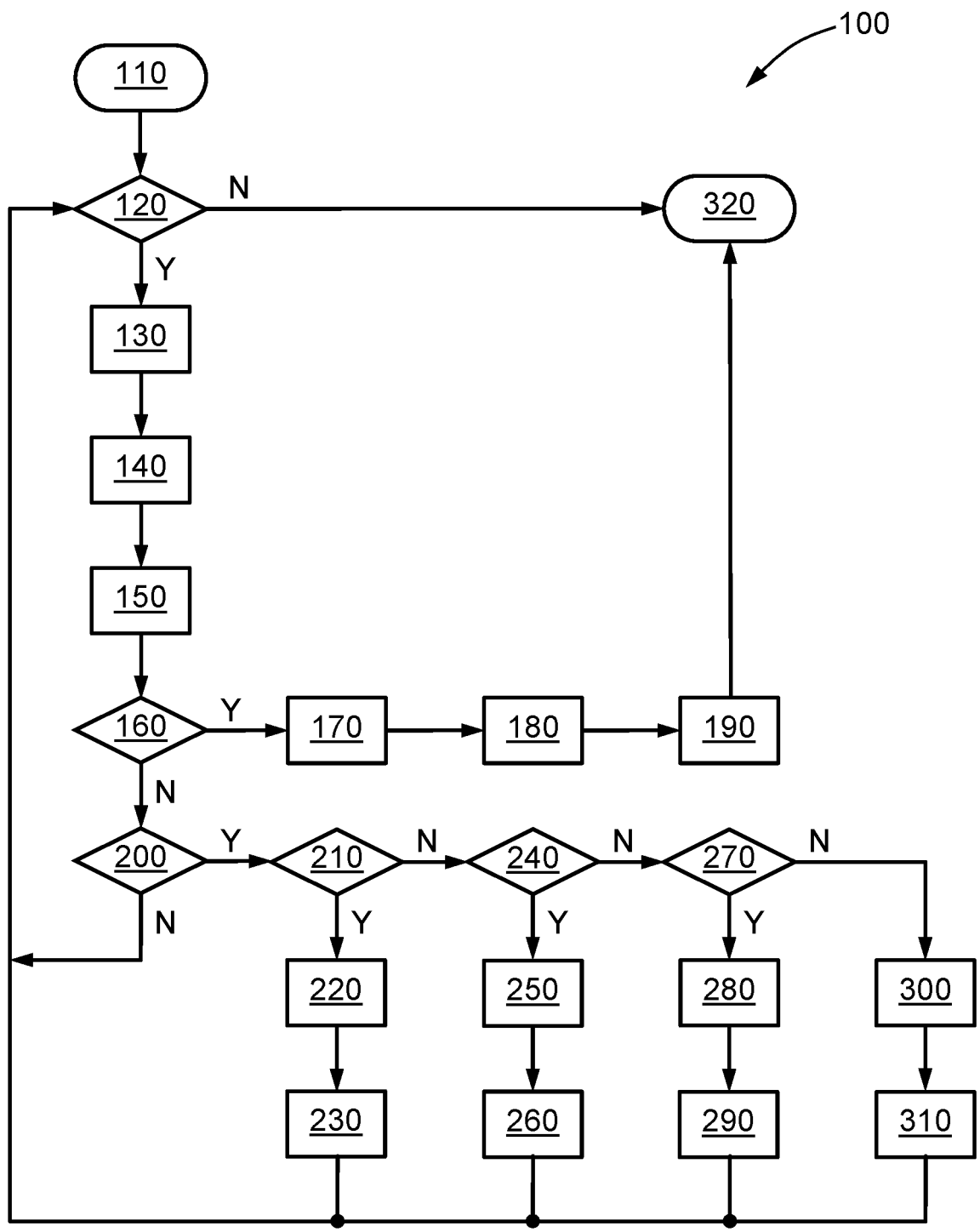
FIG. 1 is a flowchart of a method for detecting one or more characteristics of an object within an automotive vehicle.

Referring now to the drawings, wherein like numerals indicate like parts in the several views, a system 20 and a method 100 for detecting one or more characteristics of an object 11 within an automotive vehicle 10 are shown and described herein.

The system 20 and method 100 of the present disclosure provide features, benefits and technical advantages not provided by previously or currently available systems and methods. For example, the system 20 and method 100 may utilize cameras and sensors 56 that are mounted inside or outside the vehicle 10 to detect any number of predetermined alertworthy dispositions 89 of the objects 11 within the vehicle. These objects 11 may be human occupants, or they may be physical objects that may pose a threat or compromise to the safety of the occupants. The cameras or sensors 56 may be devices that are already installed on the interior 16 or exterior 18 of the vehicle 10 for other purposes (e.g., parking, proximity sensing, etc.) and which are also utilized for the system 20 and method 100 described herein, or they may be cameras or sensors 56 that are added to the vehicle 10 specifically for the system 20 and method 100 described herein.

Figure 2:
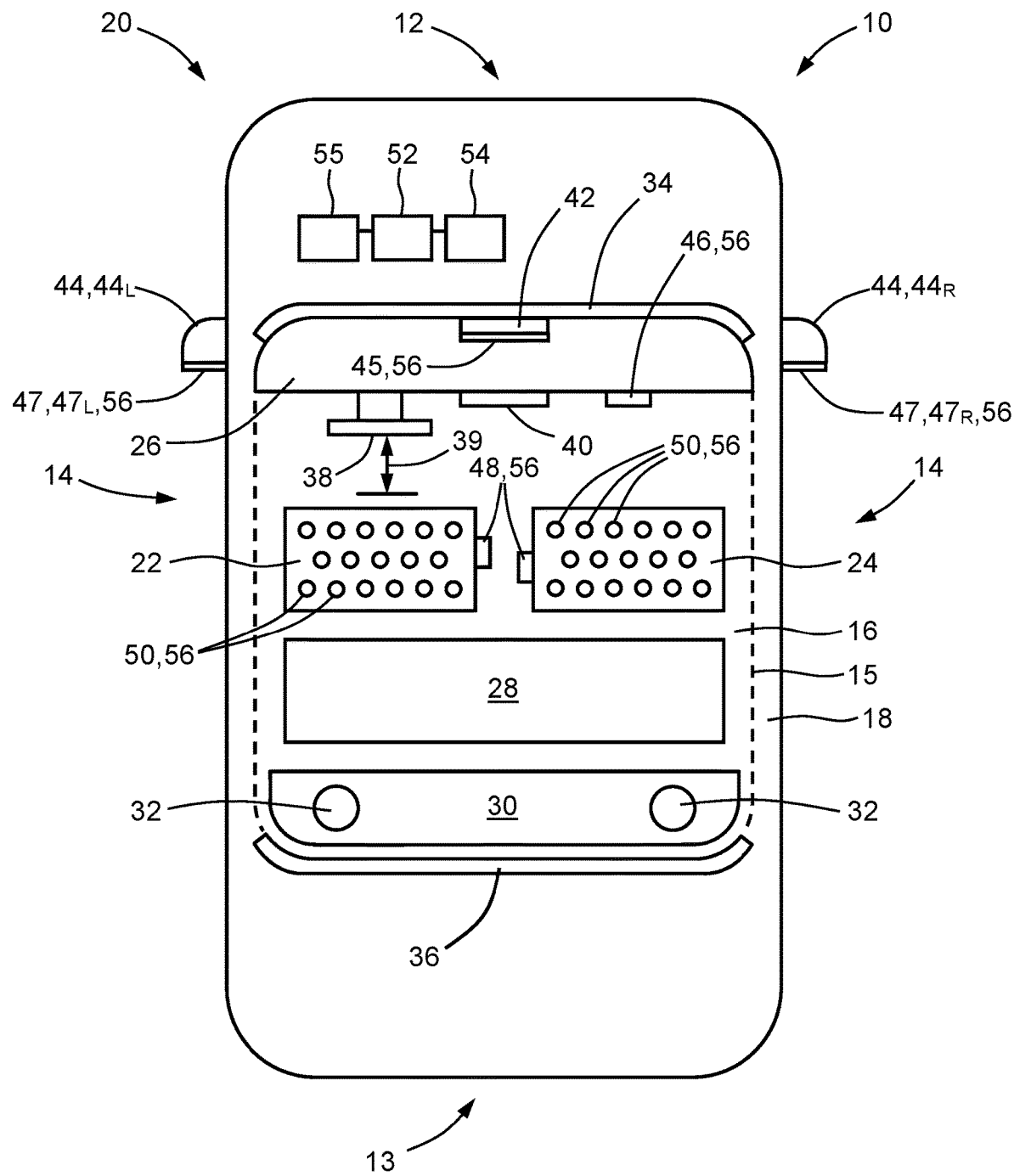
FIG. 2 is a schematic top view of an automotive vehicle and a system for detecting one or more characteristics of an object within the automotive vehicle.

FIG. 1 shows a flowchart of a method 100 for detecting one or more characteristics of an object 11 within an automotive vehicle 10, and FIG. 2 shows a schematic top view of a corresponding system 20 for detecting the one or more characteristics of the object 11. Turning first to FIG. 2, the vehicle 10 is shown having a front 12 defining a forward direction, a rear 13 defining a rearward direction, and left and right sides 14 defining left and right sideward directions. A dashed line forming a generally rounded rectangle 15 is shown encircling the front dashboard 26 and the rear deck 30, with the rounded rectangle 15 bordering the interior side of the front windshield 34 in the forward direction and bordering the interior side of the rear windshield 36 in the rearward direction. This dashed rounded rectangle 15 defines an interior 16 or cabin compartment inside the rounded rectangle 15 within which occupants (i.e., a driver and one or more passengers) may be seated, and an exterior 18 outside the cabin compartment.

Figure 3:
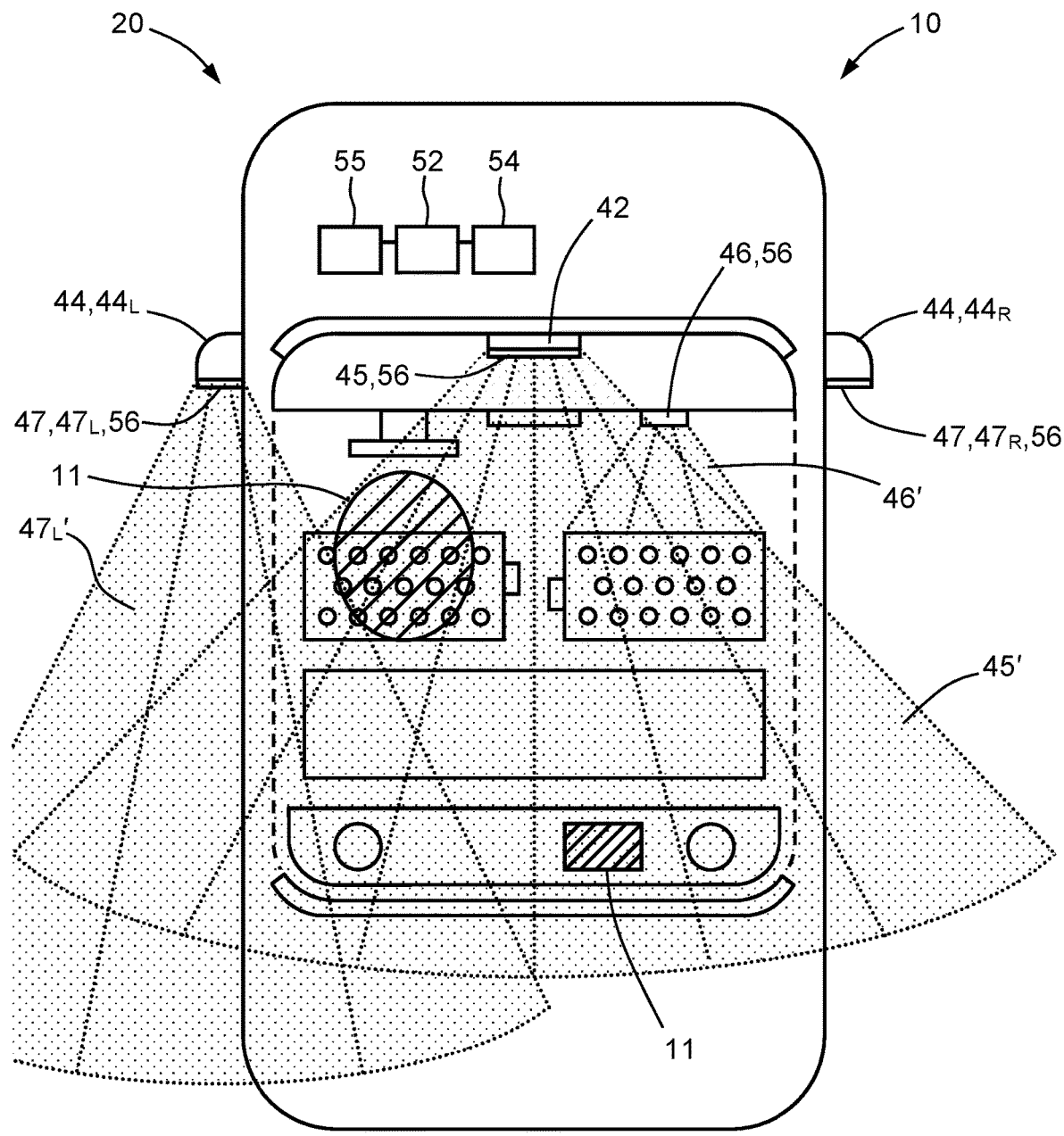
FIG. 3 is an alternative schematic top view of the automotive vehicle and system of FIG. 2, showing the beam patterns of various sensors or cameras mounted inside or outside the automotive vehicle.

The vehicle 10 also includes a front-left seat 22, a front-right seat 24 and one or more rear seats 28. The configuration shown in FIGS. 2-3 is of a "left-hand drive" vehicle 10, in which the driver is seated in the front-left seat 22 behind a steering wheel 38 or other steering apparatus (e.g., a joystick). However, the teachings of the present disclosure apply equally to "right-hand drive" configurations and so-called "autonomous" configurations in which no particular front seat 22, 24 is designated to be a driver's seat. The interior 16 also includes a display screen 40 integrated into the front dashboard 26, and a rear-view mirror or display 42 (which may comprise a reflective mirror, or a display screen showing the view of a rearward-facing camera, or both). Normally, the display screen 40 may be used to visually display information to the driver and passengers, such as vehicle speed, gear range, fuel level, audio entertainment information, camera views, etc., but the display screen 40 may also be configured to display information relating to the system 20 and method 100 of the present disclosure, as discussed further below. The display screen 40, and optionally also the rear-view mirror/display 42, may additionally include a buzzer, beeper, speaker or other device capable of producing sounds to serve as audio alerts for the occupants.

The rear-view mirror/display 42 may also include a rear-view camera or sensor 45 built into it which observes the interior 16 of the cabin. The interior 16 may also include one or more footwell cameras or sensors 46, which may be installed within or adjacent to one or both of the front footwells between the front seats 22, 24 and the front dashboard 26, and which may optionally be installed underneath the front dashboard 26 in the front footwell areas. Additionally, the interior 16 may include one or more speakers 32 installed on, within or underneath the rear deck 30 (and/or at other locations within the vehicle 10, such as on or within the front dashboard 26, the side doors (not shown), the trunk, etc.). Each of the front seats 22, 24 may have a respective seat position sensor 48 which detects how far forward each seat is positioned on its seat tracks, as well as a respective set of seat occupancy sensors 50 disposed across the top seat surface of each seat 22, 24. The seat occupancy sensors 50 may be weight sensors, or they may comprise an array which can detect localized vertical displacements of the seat surface, or any other suitable sensors configured to detect the presence of an occupant within the seat 22, 24. As for the exterior 18 of the vehicle 10, each of the side view mirrors 44 (which may include a left side view mirror $44_L$ and a right side view mirror $44_R$) may include one or more cameras or sensors 47 (which may include a left side camera/sensor $47_L$ and a right side camera/sensor $47_R$) which are rearward-facing. Each of the various cameras/sensors 45, 47, 46, 48, 50 and displays 40, 42 may be operatively connected, directly or indirectly, to a controller 52 and a "black box" recorder 54. The controller 52 may be configured to send and receive inputs, outputs and/or commands back-and-forth with each of the cameras/sensors 45, 47, 46, 48, 50 and displays 40, 42, while the recorder 54 may be configured to record data received from the cameras/sensors 45, 47, 46, 48, 50 and/or from the controller 52. A wireless transmitter 55 may be operatively connected with the controller 52 for wirelessly transmitting or broadcasting certain information, such as the status of the vehicle 10 and its various systems, as well as other information discussed further below.

Figure 4:
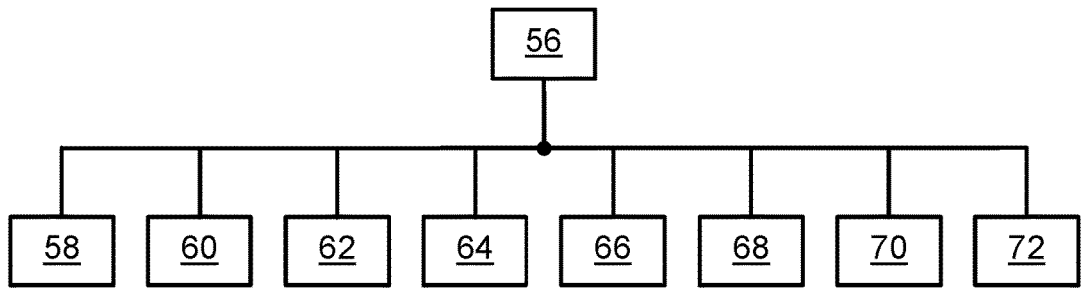
FIG. 4 is a block diagram of various sensors which may be used in the present system and method.

In addition to the cameras/sensors 45, 47, 46, 48, 50 discussed above, the vehicle 10 may also include additional sensors 56 and/or additional types of sensors 56. For example, as shown in FIG. 4, each sensor 56 may be an interior camera 58, and exterior camera a RADAR device 62, a LiDAR device 64, an ultrasonic device 66, a seat occupancy sensor 68, a seat position sensor 48, 70 or some other suitable type of sensor 72. (Note that "RADAR" stands for "radio detection and ranging", and "LiDAR" stands for "light detection and ranging".) Each of the sensors 56 is configured to sense, observe or detect one or more characteristics of an object 11 within a vehicle 10. These characteristics include the location, the orientation 88, the size and/or the object type 74 of the object 11, and the object 11 itself may be a human occupant or a physical object within the interior 16 of the vehicle 10. More specifically, as illustrated by FIG. the object type 74 may be a non-human physical object 76, an infant 78 in a forward-facing infant car seat, an infant 80 in a rearward-facing infant car seat, a booster-seated human occupant 82 (e.g., a toddler or small child sitting on a booster seat), a helmet-wearing human occupant 84 (e.g., an adolescent or an adult wearing a racing helmet) or a non-booster-seated, non-helmet-wearing human occupant 86 (e.g., a "normal" human occupant, who is not sitting on a booster seat and is not wearing a helmet).

FIG. 3 shows an alternative schematic top view of the vehicle 10 and system 20 of FIG. 2, showing the beam patterns or fields of view of various sensors or cameras mounted inside or outside the vehicle 10. For example, reference numeral 45' indicates the beam pattern or field of view of the rear-view camera/sensor 45, $47_L'$ indicates the beam pattern/field of view of the left side camera/sensor $47_L$, and 46' indicates the beam pattern/field of view of the right-front footwell camera/sensor 46. Note that no beam pattern/field of view is shown for the right side camera/sensor $47_R$, but this has been done merely to avoid cluttering the drawing; in normal use, the right side camera/sensor $47_R$ would also be emitting and/or receiving signals within its own beam patter/field of view. Note that two different objects 11 are illustrated in FIG. 3; i.e., the cross-hatched oval 11 represents a driver sitting in the front-left seat 22, and the cross-hatched rectangle 11 represents a physical object resting on the rear deck 30. It may also be noted that most of the interior 16 of the vehicle 10 is covered by the various sensor beams/fields of view, with some areas of the interior 16 being covered by multiple sensor beams/fields of view.

Utilizing the one or more sensors 56, the location, orientation 88, size and/or object type 74 of an object 11 (or of more than one object 11) may be determined, and an assessment made (e.g., by the controller 52) as to whether any object 11 is disposed in one or more predetermined alertworthy dispositions 89. These alertworthy dispositions 89 are arrangements, positionings, orientations 88, locations, situations or the like of one or more objects 11 within the interior 16 of the vehicle 10 in which a human occupant is disposed or situated in an orientation, pose or location of their body that presents a likelihood or potential for causing or exacerbating injury to the occupant in the event of an impact event, such that this likelihood or potential is greater than a predetermined allowable likelihood or potential. In other words, alertworthy dispositions 89 are situations that present a higher-than-normal (or a higher-than-allowable) risk of injury to human occupants, either due to the orientation 88, location, etc. of the human occupant within the vehicle 10, or due to objects inside the interior 16 which block the driver's view or which can act like loose projectiles during an impact.

Figures 6, 7:
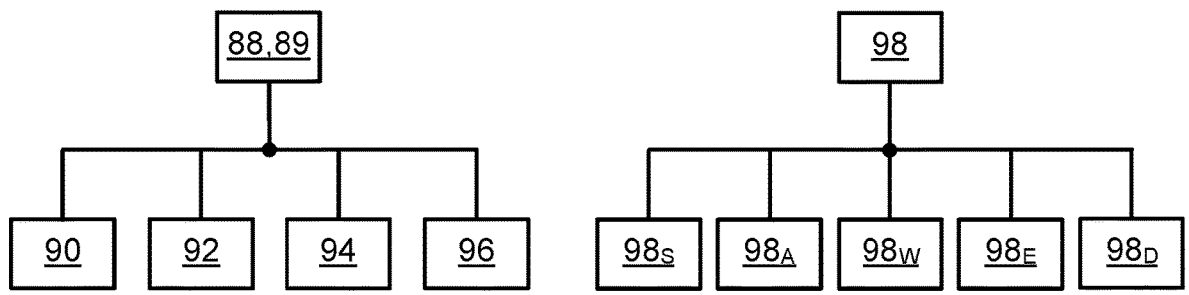
FIG. 6 is a block diagram of various orientations or predetermined alertworthy dispositions which may be encountered in the present system and method.
FIG. 7 is a block diagram of various event data which may be used in the present system and method.

The predetermined alertworthy dispositions 89 may include orientations of an occupant's body that may present a higher likelihood than normal of injury to the occupant, in the event of a vehicle collision and the airbags being deployed. For example, as illustrated by FIG. 6, these dispositions 89 include the occupant having their feet resting on the front dashboard 26 (90), the occupant's body being too close to the steering wheel 38 (i.e., being less than a predetermined minimum distance 39 away from the steering wheel 38) (92), the occupant not facing forward (e.g., they are turned around and are facing rearwards) (94), or other situations or dispositions (96) as may be predetermined. However, note that the situation mentioned in the INTRODUCTION section above—i.e., a detection of the eyes or head of a driver that indicate the driver may be falling asleep—would not be considered as an alertworthy disposition 89 according to the present disclosure. This situation (i.e., a driver falling asleep) may indeed lead to an impact event, but it would not necessarily present a higher likelihood than normal of injury to the occupants, in the event of a vehicle collision and the airbags being deployed. In other words, if an impact event occurs and the airbags are deployed, the severity of injury caused to occupants would likely not be any higher if the driver were momentarily asleep than if the driver were awake, assuming all other factors being equal. Factors that influence whether an alertworthy disposition 89 exists may include not only the foregoing situations 90, 92, 94, 96, but may also include the degree to which each situation exists; for example, how much (i.e., by how many degrees) a human occupant is turned away from a forward-facing direction (where a rearward-facing direction would be 180 degrees away, a left or right sideward-facing direction would be 90 degrees away). Further, whether an alertworthy disposition 89 exists may also depend on the object type 74 (or occupant type 75, as introduced below), as well as other factors.

Once a predetermined alertworthy disposition 89 is detected (e.g., by the controller 52), an alert may be issued so as to warn the occupants of the detected alertworthy disposition 89. Such alerts may be visual (e.g., displayed on the display screen 40), auditory (e.g., announced over the speakers 32 as an alerting tone or as a pre-recorded spoken voice), vibratory (e.g., having the steering wheel 38 or seats 22, 24, 28 vibrate), etc. In addition to such alerts, a suggested corrective action may also be given. For example, if it is detected that a passenger in the front-right seat 24 has their feet resting up on the dashboard 26, the display screen 40 and the speakers 32 may provide visual and auditory messages, respectively, that say: "The front passenger has their feet on the dashboard. Please remove your feet from the dashboard." In this way, the driver and passengers may be alerted to situations that present a higher likelihood of injury in the event of a vehicle impact (such as from the deployment of the airbags), thus providing the occupants with the opportunity to make corrections and to mitigate or avoid such elevated risks.

Turning now to FIG. 1, the method 100 of detecting one or more characteristics of an object 11 within a vehicle 10 is illustrated in flowchart form. The method 100 begins at block 110, and includes, at block 130, determining a location, an orientation 88, a size and/or an object type 74 of the object 11 within the vehicle 10, using one or more sensors 56, and, at block 150, assessing whether the object 11 is disposed in a predetermined alertworthy disposition 89. As discussed above, each of the sensors 56 may be mounted within an interior 16 of the vehicle 10 or on an exterior 18 of the vehicle 10. The method 100 may also optionally include, at block 120, determining whether the vehicle ignition is in an "ON" state and the vehicle drivetrain is in a "DRIVE" state (e.g., in a forward gear state, not in a park, neutral or reverse gear state). Additionally, the method 100 may also optionally include, at block 140, storing object information (e.g., in the controller 52 and/or in the "black box" recorder 54) that is indicative of the location, orientation 88, size and/or object type 74 of the object 11).

At block 160, a determination is made as to whether an impact event (e.g., vehicle collision) has been detected; if "yes", then the flow proceeds on to the branch beginning with block 170, but if "no", then the process flows to the branch beginning with block 200.

At block 170, an impact event has been detected, so information about the object(s) 11 within the vehicle 10 is wirelessly transmitted or broadcasted, such as to a "back office" telemetry and monitoring service like General Motors Corporation's OnStar® service. This object information is indicative of the location, orientation 88, size and/or object type 74 of the object 11. For example, the object information may indicate that a normal human occupant 86 is sitting in the front-left driver's seat 22, and a rear-facing infant is in a car carrier in the front passenger's seat 24. Or, as another example, the object information may indicate that a normal human occupant 86 is sitting in the front-left driver's seat 22 but is too close to the steering wheel 38 (i.e., their distance away from the steering wheel 38 is less than the predetermined minimum distance 39), and a normal occupant 86 is sitting in the front passenger's seat 24 facing sideways with their feet resting up on the dashboard 26. Optionally, the wireless transmission or broadcast may also include event data 98, such as information regarding the vehicle 10 and its occupants at the moment of the impact event. For example, event data 98 may include one or more of the vehicle speed 98s, the vehicle acceleration/deceleration 98A, the vehicle weight 98w, seat belt engagement status information 98E (which may include the engagement status of every set of seat belts in the vehicle and airbag deployment information 98D (which may include the deployment status of every airbag in the vehicle 10). Other types of impact event-related data may be included in event data 98 as well.

At block 180, the object information and/or event data 98 may be used to determine an "enhanced ISP". Here, ISP stands for "Injury Severity Prediction", which is a methodology known in the automotive and emergency services space for predicting the severity of injuries that might be sustained by occupants in a vehicle impact, based on various factors. Also, as used herein, an "enhanced" ISP is one that utilizes special factors that are not currently considered or even normally available for the determination of an ISP. These special factors may include the abovementioned object information—i.e., the location, orientation 88, size and/or object type 74 of the object 11 within the vehicle 10. These special factors may urge the determination of an ISP that is different from (and thus "enhanced" in comparison to) ISPs that are determined using presently available protocols.

At block 190, the enhanced ISP may be sent to first responders, such as fire and rescue services, paramedics, etc. This enhanced ISP may provide additional information and forewarning to emergency services personnel that is currently not available with presently known ISP determination protocols. For example, an enhanced ISP may indicate that potential injuries may be more or less severe than would be indicated by presently available ISPs, or the predicted injuries may be of such a nature that special procedures should be followed (e.g., the injured occupant should be taken to one particular hospital rather than another, an airlift should be ordered, etc.). After block 190, the process may route to block 320, which ends the process.

It may be noted that currently, back office telemetry and monitoring services are typically the party which determines an ISP, and thus may also determine an enhanced ISP using the teachings of the present disclosure. Further, it is also conceivable that the vehicle 10 itself may determine an enhanced ISP, such as by using the controller 52 and appropriate software or programming therewith. In such cases, the vehicle 10 might also perform the sending of the enhanced ISP to available first responders, such as by wirelessly transmitting or broadcasting a distress message containing the enhanced ISP, and/or containing some or all of the object information and event data 98.

If no impact event was detected at block 160, then the process flow routes to block 200, where it is determined whether the object 11 is disposed in a predetermined alertworthy disposition 89; if "yes", then the process flow moves on to block 210, but if "no", then the process flow returns back to block 120 and continues. Block 210 begins a process of determining whether particular alertworthy dispositions 89 are detected one-by-one, as represented by the four vertical branches downstream of block 210. At each branch, if the object 11 is assessed as being disposed in a predetermined alertworthy disposition 89, then a visual, auditory or other alert may be provided within the vehicle 10 of the alertworthy disposition 89 of the object. Additionally, a visual or auditory corrective action suggestion may be provided within the vehicle 10 (e.g., on the display screen 40 or over the speakers 32) for mitigating the alertworthy disposition 89.

For example, at block 210, it may be determined by the sensors 56 and the controller 52 whether an occupant has their feet up on the dashboard 26. If so, then at block 220 an alert may be provided, and at block 230 a suggested corrective action may be provided. However, if it is not detected that an occupant has their feet up on the dashboard 26, then at block 240 it may be determined whether an occupant's body is disposed or situated too close to the steering wheel 38; if so, then at block 250 an appropriate alert may be provided, and at block 260 a corresponding corrective action may be suggested. A similar process occurs at block 270, where it may be determined whether an occupant's body is facing sideward or rearward (i.e., not forward); if that is the case, then at block 280 an alert is provided and at block 290 a suggested corrective action may be provided. Finally, if no alertworthy dispositions 89 are determined at blocks 210, 240 or 270, then the process flow routes to the final vertical branch at block 300, which in FIG. 1 addresses a fourth of the four predetermined alertworthy dispositions 89. Similar to the other three branches, at block 300 a visible, audible or other alert is provided, and at block 310 a visible or audible corrective action is provided. At the end of each of the four vertical branches, the process flow routes back to block 120, and the method 100 continues to run through successive cycles until the flow reaches the end at block 320, or power is cut to the controller 52 or device which is executing the method 100.

In this method 100, the one or more sensors may be at least one of an interior camera 58 mounted within the interior 16 of the vehicle 10, an exterior camera 60 mounted on the exterior 18 of the vehicle 10, a RADAR device 62 mounted within the interior 16 of the vehicle 10, a LiDAR device 64 mounted within the interior 16 of the vehicle 10, an ultrasonic device 66 mounted within the interior 16 of the vehicle 10, a seat occupancy sensor 68 mounted in a seat 22, 24, 28 within the interior 16 of the vehicle 10, and a seat position sensor 48, 70 mounted in or in connection with a seat 22, 24, 28 within the interior 16 of the vehicle 10.

In the foregoing method 100, the predetermined alertworthy disposition 89 may include: (i) if the object 11 is not a human occupant, then one or more of: (a) the object 11 being disposed so as to obstruct a driver's view to the front 12, rear 13 or either side 14 of the vehicle and (b) the object 11 being disposed so as to have a substantial likelihood of causing bodily injury to an occupant within the vehicle 10 in the event of an impact event (e.g., the object 11 being capable of acting like a projectile within the interior 16 of the vehicle 10 as a result the impact event); or (ii) if the object 11 is a human occupant, then one or more of: (w) at least one foot of the occupant resting on the dashboard 26, (x) a body of the occupant being less than a predetermined minimum distance 39 away from the steering wheel 38, (y) the body of the occupant facing in a non-forward direction, and (z) the occupant being disposed in an orientation 88 and/or a location that presents a potential for causing or exacerbating injury to the occupant in the event of an impact event (which may include or trigger deployment of the airbags), wherein the potential is greater than a predetermined allowable potential.

In the method 100, the object type 74 may include one or more of a non-human physical object (76), an infant in a forward-facing infant car seat (78), an infant in a rearward-facing infant car seat (80), a booster-seated human occupant (82), a helmet-wearing human occupant (84), and a non-booster-seated, non-helmet-wearing human occupant (86). Additionally, the location of the object 11 (i.e., the physical object 76 or human occupant) may be defined to be where the centroid of the object 11 is located.

Figure 8:
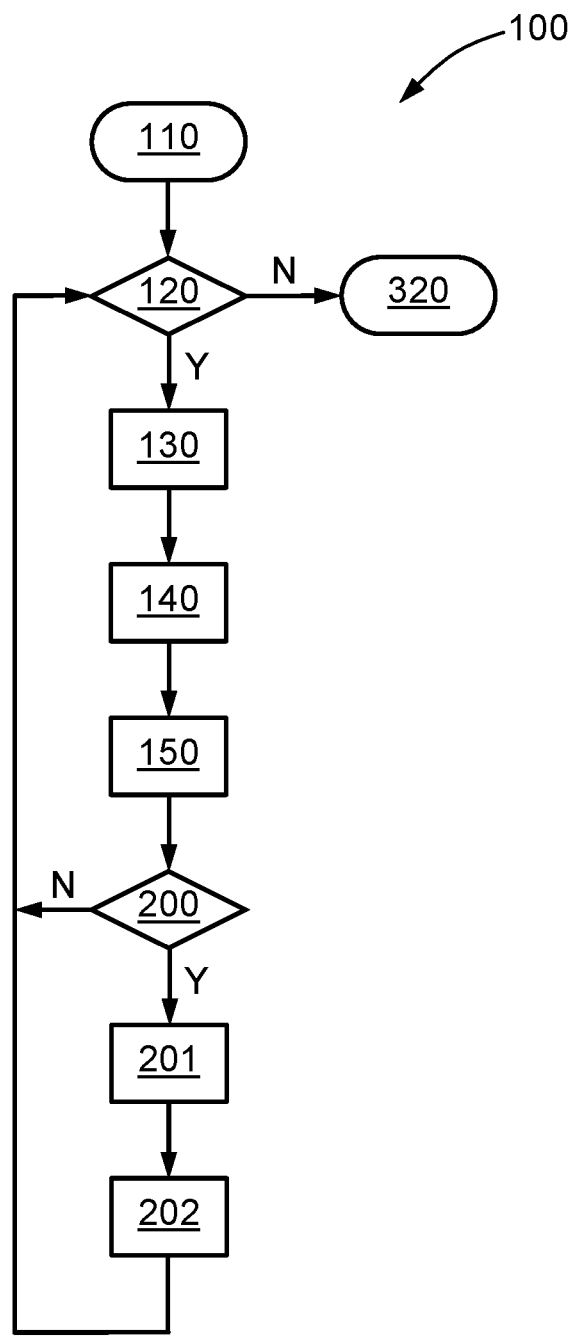
FIG. 8 is a flowchart of an alternative method for detecting one or more characteristics of an object within an automotive vehicle.

According to another configuration or embodiment as illustrated in FIG. 8, a method 100 for detecting one or more characteristics of an occupant within an automotive vehicle 10 includes: (i) at block 130, determining one or more of a location, an orientation 88, a size and an occupant type 75 of the occupant using one or more sensors 56, wherein each of the one or more sensors 56 is an interior camera 58 mounted within an interior 16 of the vehicle 10, an exterior camera 60 mounted on an exterior 18 of the vehicle 10, a RADAR device 62 mounted within the interior 16, a LiDAR device 64 mounted within the interior 16, or an ultrasonic device 66 mounted within the interior 16; (ii) at block 150, assessing whether the occupant is disposed in a predetermined alertworthy disposition 89; and (iii) if the occupant is assessed at block 200 as being disposed in a predetermined alertworthy disposition 89, then at block 201 providing a visual or auditory alert within the vehicle 10 of the alertworthy disposition 89 of the occupant, and optionally at block 202 providing a visual or auditory corrective action suggestion which corresponds to the alertworthy disposition 89.

Figure 5:
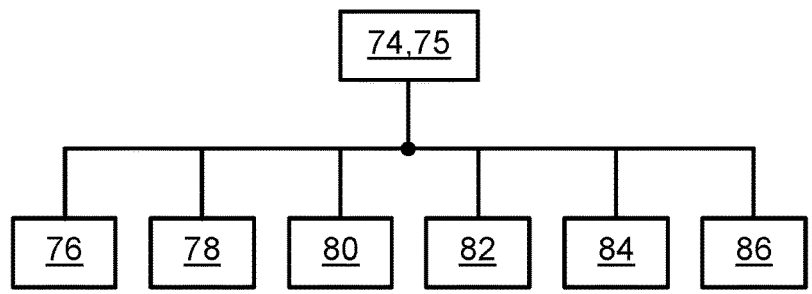
FIG. 5 is a block diagram of various object types which may be encountered in the present system and method.

As shown in FIG. 5, the occupant type 75 may include one or more of an infant in a forward-facing infant car seat (78), an infant in a rearward-facing infant car seat (80), a booster-seated human occupant (82), a helmet-wearing human occupant (84), and a non-booster-seated, non-helmet-wearing (i.e., "normal") human occupant (86). Additionally, the predetermined alertworthy disposition 89 may include one or more of the occupant having at least one foot resting on a dashboard 26 of the vehicle 10 (90), a body of the occupant being less than a predetermined minimum distance 39 away from the steering wheel 38 (92), the body of the occupant facing in a non-forward direction (94), and the occupant being disposed in an orientation 88 and/or a location that presents a potential for causing or exacerbating injury to the occupant in the event of an impact event, wherein the potential is greater than a predetermined allowable potential (96).

According to yet another embodiment, such as illustrated in FIGS. 2-3, a system for detecting one or more characteristics of an object 11 within an automotive vehicle 10 includes one or more sensors 56 each mounted within an interior 16 of the vehicle 10 or on an exterior 18 of the vehicle 10, and a controller 52 operably connected with the one or more sensors 56. Each of the one or more sensors 56 is configured to detect one or more of a location, an orientation 88, a size and an object type 74 of the object 11 within the interior 16 of the vehicle and the controller 52 is configured to assess whether the object 11 is disposed in a predetermined alertworthy disposition 89.

In this system 20, the one or more sensors 56 may be at least one of an interior camera 58 mounted within the interior 16 of the vehicle 10, an exterior camera 60 mounted on the exterior 18 of the vehicle 10, a RADAR device 62 mounted within the interior 16, a LiDAR device 64 mounted within the interior 16, an ultrasonic device 66 mounted within the interior 16, a seat occupancy sensor 68 mounted in a seat 22, 24, 28 within the interior 16 of the vehicle 10, and a seat position sensor 48, 70 mounted in or associated with a seat 22, 24, 28 within the interior 16 of the vehicle 10.

Additionally in this system 20, the predetermined alertworthy disposition 89 may include: (i) if the object 11 is not a human occupant (e.g., a physical object), then one or more of: (a) being disposed so as to obstruct a view of a driver of the vehicle 10 to a front 12, a rear 13 or a side 14 of the vehicle 10, and (b) being disposed so as to have a substantial likelihood of causing bodily injury to an occupant within the vehicle 10 in the event of an impact event; or (ii) if the object 11 is a human occupant, then one or more of: (w) at least one foot of the occupant resting on a dashboard 26 of the vehicle 10, (x) a body of the occupant being less than a predetermined minimum distance 39 away from a steering wheel 38 of the vehicle 10, (y) the body of the occupant facing in a non-forward direction, and (z) the occupant being disposed in an orientation 88 and/or a location that presents a potential for causing or exacerbating injury to the occupant in the event of an impact event, wherein the potential is greater than a predetermined allowable potential.

The system 20 may further include a memory 54 (e.g., a "black box" recorder) operably connected with the controller 52 and configured to store object information indicative of the determined location, orientation 88, size and/or object type 74 of the object 11, as well as a transmitter 55 operably connected with the controller 52 and configured to wirelessly transmit object information indicative of the determined location, orientation 88, size and/or object type 74 of the object 11. The system 20 may also include an alert device (e.g., a display screen 40 or speakers 32) operably connected with the controller 52 and configured to provide visual or auditory alerts within the vehicle 10 of the alertworthy disposition 89 of the object 11.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51 to 99% out of a possible extent of 100%", and do not necessarily mean "perfectly", "completely", "strictly", "entirely" or "100%". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

The flowcharts and block diagrams in the drawings illustrate the architecture, functionality and/or operation of possible implementations of systems, methods and computer program products according to various embodiments of the present disclosure. In this regard, each block in the flowchart or block diagrams may represent a module, segment or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by hardware-based systems that perform the specified functions or acts, or combinations of hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the functions and/or actions specified in the flowcharts and block diagrams.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A method for detecting one or more characteristics of one or more occupants including a driver within an automotive vehicle, comprising:
    determining one or more of a respective location, respective orientation, a respective size and a respective occupant type of each of the one or more occupants within the vehicle using one or more sensors, wherein each of the one or more sensors is mounted within an interior of the vehicle or on an exterior of the vehicle; and
    assessing whether any of the one or more occupants is disposed in a predetermined alertworthy disposition;
    wherein the predetermined alertworthy disposition comprises a body of the driver being less than a predetermined minimum distance away from a steering wheel of the vehicle and one or more of (i) at least one foot of the one or more occupants resting on a dashboard of the vehicle, (ii) at least one body of the one or more occupants facing in a non-forward direction and (iii) at least one of the one or more occupants being disposed in an orientation and/or a location that presents a potential for causing or exacerbating injury to at least one of the one or more occupants in the event of an impact event, wherein the potential is greater than a predetermined allowable potential.

2. The method of claim 1, further comprising:
    if any of the one or more occupants is assessed as being disposed in the predetermined alertworthy disposition, then providing a visual or auditory alert within the vehicle of the alertworthy disposition.

3. The method of claim 2, further comprising:
    providing a visual or auditory corrective action suggestion within the vehicle for mitigating the alertworthy disposition.

4. The method of claim 1, wherein the one or more sensors is at least one of:
    an interior camera mounted within the interior of the vehicle;
    an exterior camera mounted on the exterior of the vehicle;
    a RADAR device mounted within the interior of the vehicle;
    a LiDAR device mounted within the interior of the vehicle;
    an ultrasonic device mounted within the interior of the vehicle;
    a seat occupancy sensor mounted in a seat within the interior of the vehicle; and a seat position sensor mounted in the seat within the interior of the vehicle.

5. The method of claim 1, wherein the occupant type includes one or more of:
   an infant in a forward-facing infant car seat;
   an infant in a rearward-facing infant car seat;
   a booster-seated human occupant;
   a helmet-wearing human occupant; and
   a non-booster-seated, non-helmet-wearing human occupant.

6. The method of claim 1, further including:
   detecting whether a vehicle impact event has occurred; and
   if a vehicle impact event is detected, then wirelessly broadcasting the determined respective location, orientation, size and/or occupant type of each of the one or more occupants.

7. The method of claim 6, further including:
   determining an enhanced injury severity prediction based on the wirelessly broadcasted respective location, orientation, size and/or occupant type of each of the one or more occupants; and
   sending the enhanced injury severity prediction to one or more first responders.

8. The method of claim 1, further including:
   storing occupant information indicative of the determined respective location, orientation, size and/or occupant type of each of the one or more occupants.

9. The method of claim 1, further including:
   wirelessly transmitting occupant information indicative of the determined respective location, orientation, size and/or occupant type of each of the one or more occupants.

10. The method of claim 1, wherein the respective location of each of the one or more occupants is a respective location of a respective centroid of each of the one or more occupants.

11. A method for detecting one or more characteristics of one or more occupants including a driver within an automotive vehicle, comprising:
    determining one or more of a respective location, a respective orientation, a respective size and a respective occupant type of each of the one or more occupants using one or more sensors, wherein each of the one or more sensors is an interior camera mounted within an interior of the vehicle, an exterior camera mounted on an exterior of the vehicle, a RADAR device mounted within the interior of the vehicle, a LiDAR device mounted within the interior of the vehicle or an ultrasonic device mounted within the interior of the vehicle; and
    assessing whether any of the one or more occupants is disposed in a predetermined alertworthy disposition, wherein the predetermined alertworthy disposition comprises a body of the driver being less than a predetermined minimum distance away from a steering wheel of the vehicle and one or more of (i) at least one foot of the one or more occupants resting on a dashboard of the vehicle, (ii) at least one body of the one or more occupants facing in a non-forward direction and (iii) at least one of the one or more occupants being disposed in an orientation and/or a location that presents a potential for causing or exacerbating injury to at least one of the one or more occupants in the event of an impact event, wherein the potential is greater than a predetermined allowable potential; and
    if any of the one or more occupants is assessed as being disposed in the predetermined alertworthy disposition, then providing a visual or auditory alert within the vehicle of the alertworthy disposition of the one or more occupants.

12. The method of claim 11, wherein the occupant type includes one or more of:
    an infant in a forward-facing infant car seat;
    an infant in a rearward-facing infant car seat;
    a booster-seated human occupant;
    a helmet-wearing human occupant; and
    a non-booster-seated, non-helmet-wearing human occupant.

13. The method of claim 11, further including:
    detecting whether a vehicle impact event has occurred; and
    if a vehicle impact event is detected, then wirelessly broadcasting the determined respective location, orientation, size and/or occupant type of each of the one or more occupants.

14. The method of claim 13, further including:
    determining an enhanced injury severity prediction based on the wirelessly broadcasted respective location, orientation, size and or occupant type of each of the one or more occupants; and
    sending the enhanced injury severity prediction to one or more first responders.

15. A system for detecting one or more characteristics of one or more occupants including a driver within an automotive vehicle, comprising:
    one or more sensors each mounted within an interior of the vehicle or on an exterior of the vehicle, wherein each of the one or more sensors is configured to detect one or more of a respective location, a respective orientation, a respective size and a respective occupant type of each of the one or more occupants within the vehicle; and
    a controller operably connected with the one or more sensors and configured to assess whether any of the one or more occupants is disposed in a predetermined alertworthy dispositions;
    wherein the predetermined alertworthy disposition comprises a body of the driver being less than a predetermined minimum distance away from a steering wheel of the vehicle and one or more of (i) at least one foot of the one or more occupants resting on a dashboard of the vehicle, (ii) at least one body of the one or more occupants facing in a non-forward direction and (iii) at least one of the one or more occupants being disposed in an orientation and/or a location that presents a potential for causing or exacerbating injury to at least one of the one or more occupants in the event of an impact event, wherein the potential is greater than a predetermined allowable potential.

16. The system of claim 15, wherein the one or more sensors is at least one of:
    an interior camera mounted within the interior of the vehicle;
    an exterior camera mounted on the exterior of the vehicle;
    a RADAR device mounted within the interior of the vehicle;
    a LiDAR device mounted within the interior of the vehicle;
    an ultrasonic device mounted within the interior of the vehicle;
    a seat occupancy sensor mounted in a seat within the interior of the vehicle; and a seat position sensor mounted in the seat within the interior of the vehicle.

17. The system of claim 15, further comprising:
a memory operably connected with the controller and configured to store occupant information indicative of the determined respective location, orientation, size and/or occupant type of each of the one or more occupants.

18. The system of claim 15, further including:
a transmitter operably connected with the controller and configured to wirelessly transmit occupant information indicative of the determined respective location, orientation, size and/or occupant type of each of the one or more one or more occupants.

19. The system of claim 15, further comprising:
an alert device operably connected with the controller and configured to provide visual or auditory alerts within the vehicle of the alertworthy disposition.

20. The system of claim 15, wherein the occupant type includes one or more of an infant in a forward-facing infant car seat; an infant in a rearward-facing infant car seat; a booster-seated human occupant; a helmet-wearing human occupant; and a non-booster-seated, non-helmet-wearing human occupant.

* * * * *